US011207767B2

(12) United States Patent
Guisasola

(10) Patent No.: US 11,207,767 B2
(45) Date of Patent: Dec. 28, 2021

(54) SCREW TENSIONING DEVICE

(71) Applicant: Caterpillar Energy Solutions GmbH, Mannheim (DE)

(72) Inventor: Inigo Guisasola, Landau (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 0 days.

(21) Appl. No.: 15/747,519

(22) PCT Filed: Jul. 15, 2016

(86) PCT No.: PCT/EP2016/001257
§ 371 (c)(1),
(2) Date: Jan. 25, 2018

(87) PCT Pub. No.: WO2017/016654
PCT Pub. Date: Feb. 2, 2017

(65) Prior Publication Data
US 2018/0215022 A1 Aug. 2, 2018

(30) Foreign Application Priority Data
Jul. 28, 2015 (DE) .......................... 102015009550.1

(51) Int. Cl.
B25B 29/02 (2006.01)
B23P 19/06 (2006.01)
F16B 31/04 (2006.01)
(52) U.S. Cl.
CPC ............ *B25B 29/02* (2013.01); *B23P 19/067* (2013.01); *F16B 31/043* (2013.01)

(58) Field of Classification Search
CPC ....... B25B 29/02; B23P 19/067; F16B 31/043
(Continued)

(56) References Cited

U.S. PATENT DOCUMENTS

| 4,246,810 A * | 1/1981 | Keske | B25B 29/02 81/57.38 |
| 7,055,408 B2 * | 6/2006 | Sasaki | B23P 19/06 81/433 |

(Continued)

FOREIGN PATENT DOCUMENTS

| DE | 2238974 A1 | 2/1974 | |
| SU | 569447 A1 * | 8/1977 | ............. B25B 29/02 |
| WO | WO 82/00851 A1 | 3/1982 | |

OTHER PUBLICATIONS

SU-569447-A1 EspaceNet Translation (Year: 1977).*
International Search Report related to Application No. PCT/EP2016/001257 reported on Oct. 5, 2016.

*Primary Examiner* — Michael D Jennings
*Assistant Examiner* — Makena S Markman

(57) ABSTRACT

A screw tensioning device for tensioning or loosing tensionable screw connections comprises a fixation element to be connected to a screw, a support element moveable relative to the fixation element. The support element is arranged moveable relative to the fixation element to apply tension to or remove tension from the screw. A piston is positioned and movable within the fixation element. A volume containing a hydraulic fluid is defined at least partly by the piston, the fixation element or the support element. The movement of the piston manipulates the volume and thereby moves the fixation element with respect to the support element.

11 Claims, 2 Drawing Sheets

(58) Field of Classification Search
USPC .......................................................... 81/57.38
See application file for complete search history.

(56) References Cited

U.S. PATENT DOCUMENTS

| | | | |
|---|---|---|---|
| 9,289,888 B2* | 3/2016 | Kastner | B23P 19/067 |
| 10,239,194 B2* | 3/2019 | Hohmann | B25B 29/02 |
| 2005/0165397 A1* | 7/2005 | Faus | B23P 19/067 |
| | | | 81/57.38 |
| 2013/0087022 A1* | 4/2013 | Kastner | B23P 19/067 |
| | | | 81/57.38 |

* cited by examiner

SCREW TENSIONING DEVICE

CROSS-REFERENCE TO RELATED APPLICATION

This Application is a 35 USC § 371 US National Stage filing of International Application No. PCT/EP2016/001257 filed on Jul. 15, 2016 which claims priority under the Paris Convention to German Serial No. 102015009550.1 filed Jul. 28, 2015.

TECHNICAL FIELD

The present disclosure relates to a screw tensioning device and a method for tensioning and/or loosening tensable screw connections.

BACKGROUND

In addition to the basic forms of various screw connections, so called tensable screw connections have already been used for decades. In particular screw tensioning devices are used in steel constructions and various engine design applications. Screw tensioning devices all operate generally according to the same well known principle based on torque-free tensioning methods. In order to apply tension to a screw or bolt, the first end of said screw is typically connected to a first component via threaded means. The second end is then extended through a second component. A nut may then be placed on the screw to secure the first and second components. Tension may then be applied to the screw. The nut may then be further tightened to maintain the tension applied to the screw. After the nut is tightened the screw tensioning device may be disconnected from the screw.

For example, EP 2585225 discloses such a screw tensioning device. In that disclosure, a first and second component are connected to one another using a screw. A support element like a cylinder is then placed on the second component. A fixation element is then connected to the second end of the screw to be tensioned. A hydraulic piston assembly, configured to apply tension to the screw, is positioned between the fixation element and the support element. By supplying the hydraulic cylinder-piston-assembly with a hydraulic fluid a piston of the cylinder-piston assembly will move in respect to a cylinder of the piston-cylinder assembly. This causes a movement of the fixation element in respect to the support element. The fixation element connected to the piston of the cylinder-piston assembly. The support element is connected to the cylinder of the cylinder-piston assembly. The hydraulic fluid is pressed to the cylinder-piston assembly by a second piston-cylinder arrangement operated by a pneumatic cylinder. The first end of the screw, that is connected to the first component; will be moved in respect to the second end of the screw by moving the fixation element in relation to the support element. Therefore the distance between the first end and the second end of the screw increases and the screw may be tensioned. The threaded screw retains its tensioned force for tensioning the component by turning the nut positioned on the screw in direction towards the component. In a final position the nut abuts the second element.

This screw tensioning method according to EP 2585225 allows the creation of a defined tightening force to connect the first and second elements. The tensioning force in the screw connection is defined in this method by the pulling force applied to the screw instead of the torque needed to turn the nut. Thus, it is possible to realize considerably higher and better defined tensioning forces in the screw connection in comparison to the torque based connecting methods. However, hydraulic screw tensioning devices require cost intensive high pressure hydraulic pumps. High-pressure hydraulic lines, frequently even very long hydraulic lines, are likewise required to connect the pump and the screw tensioning device. As there is high pressure in these hydraulic lines, these hydraulic lines could be damaged and the high pressurized fluid may escape from the lines.

Moreover the high pressure hydraulic pump has to be transported to the respective assembly location, where the components are intended to be fixed to each other and to be supplied with sufficient energy like electric power. This makes it inconvenient in particular for service actions, which could take place at remote locations.

The present disclosure is directed, at least in part, to improving or overcoming one or more aspects of prior systems.

SUMMARY OF THE DISCLOSURE

According to a first aspect of the invention a screw tensioning device for tensioning or loosing tensionable screw connections is disclosed.

The screw tensioning device comprises a fixation element to be connected to a screw and a support element moveable relative to the fixation element. The fixation element is arranged to be moveable relative to the fixation element to apply tension to or remove tension from the screw. The screw tension device further comprises a piston positioned and movable within the fixation element. A volume containing a hydraulic fluid is defined at least partly by the piston, the fixation element, or the support element. The piston is arrange that the movement of the piston manipulates the volume and thereby moves the fixation element with respect to the support element.

According to another aspect of the disclosure a method for manipulating tension within a screw connection comprises connecting a fixation element to a screw to which tension is to be applied or removed, positioning a support element on a component to be connected by the screw connection, moving linearly the fixation element in respect to the support element by rotating a piston around its main axis.

Other features or aspect of this disclosure will be apparent from the following description and the accompanying drawings.

DETAILED DESCRIPTION

Figure 1:
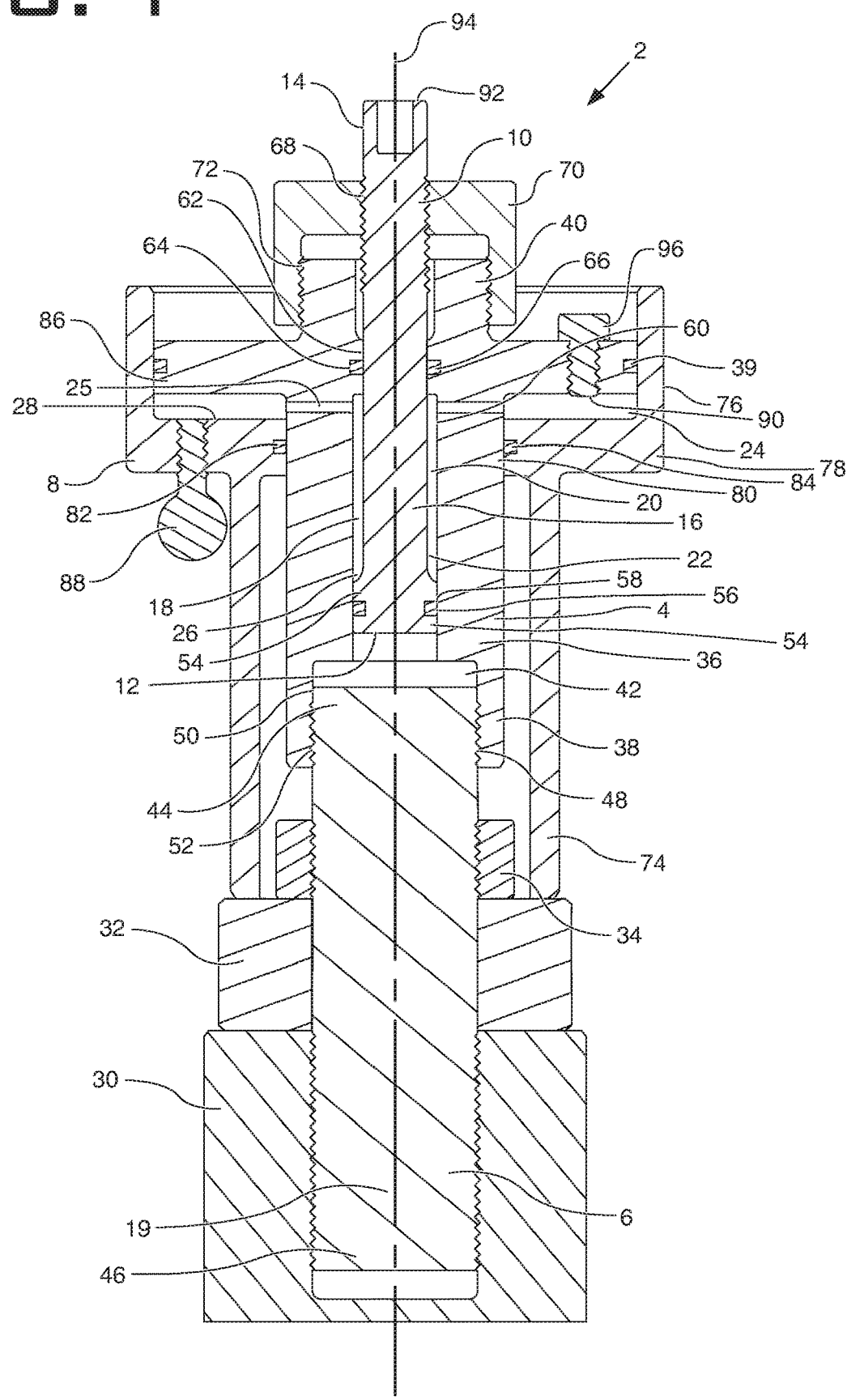
FIG. 1 shows a diagrammatic sectional view of a screw tensioning device.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

FIG. 1 shows a screw tensioning device 2 for tensioning or loosening screw connections. The screw tensioning device 2 may comprise a fixation element 4 that is connectable to a screw 6. The screw tensioning device 2 may also comprise a support element 8 that can be moved relative to the fixation element 4 to pretense or loosen the screw 6. The screw tensioning device 2 may further comprise a piston 10 having a first end 12 and a second end 14 that are distal to one another and connected by a shaft 16. The piston 10 is disposed within a first bore 18 defined by the fixation element 4. The first bore 18 extends along the main axis 19 of the fixation element 4. A variable volume 20 may be defined by the space between the piston 10 and the first bore 18. Hydraulic fluid may be disposed within the variable volume 20. The variable volume 20 may comprise two distinct portions; a piston portion 22 and an effective portion 24, which may be connected by one or more second bores 25 that extend axially into the fixation element 4. The piston portion 22 contains a base area 26 and generally runs adjacent the shaft 16. The effective portion 24 also contains a base area 28 and generally runs perpendicular to the shaft 16. The base area 26 of the piston portion 22 is smaller than the base area 28 of the effective portion 24.

The screw tensioning device 2 may be used to preload or untighten a tensionable screw connection. As used in this disclosure, screw may be a conventional screw, bolt or tensionable connection device. The term "tensionable" as defined throughout this disclosure shall mean that feature of an element, in particular a screw, comprising a portion that may be stretched by force and is able to store an amount of elastic energy. In particular a tensionable element may also be a screw, which comprises a first end to be fixed to a first component and a second end which is positioned on a side of a second component, which side is opposite to a side of the second component facing the first component, and an elastic part, which is positioned between the first end and the second end and may be stretched by applying force to the second end.

As shown in FIG. 1, screw 6 is tensionable and is intended to connect a first component 30 to a second component 32. For example, the first component 30 may be an engine crank case and the second component 32 may be a turbo charger mount. Screw 6 may be fixed to the first component 30 by means of a threaded engagement. Screw 6 may extend through or along the second component 32 and held in place with a nut 34. Nut 34 may also be in threaded engagement with screw 6.

The fixation element 4 comprises a first cylindrical portion 36 with a first end 38 and a second end 40. At the first end 38 the fixation element 4 comprises a cylindrical recess 42 to house a first end 44 of the screw 6, while a second end 46 of the screw 6 is connected to the first component 30 through a threaded engagement.

The recess 42 at the first end 38 of the fixation element 4 comprises a thread 48 in particular an internal screw thread 48 at a side wall 50 of the recess 42. The thread 48 may be arranged along the whole side wall 50 of the recess 42 or may be positioned on a part of the side wall 50 for example on an upper or a lower part of the side wall 50. The screw 6 comprises a thread 52 at the first end 44 to engage with the internal thread 48 at the side wall 50 of the recess 42.

The variable volume 20 comprises both a piston portion 22 and an effective portion 24 that are fluid communication with one another via bore 25. Hydraulic fluid may be disposed within the variable volume 20. Hydraulic fluid may move back and forth between the piston portion 22 and the effective portion 24. During operation, the position of piston 10 determines how much hydraulic fluid is displaced from the piston portion 22 to the effective portion 24, and vice versa. As shown in FIG. 1, when piston 10 is moved in an upward direction, the size of the piston portion 22 gets smaller; thus displacing hydraulic fluid out of the piston portion 22, through bore 25 and into the effective portion 24. Pressure within the effective portion 24 increases as more and more hydraulic fluid enters. This pressure acts on the fixation element 4 and causes it to move in a direction away from the support element 8. This movement causes screw 6 to be stretched or tensioned. Nut 34 may then be tightened to maintain the tension in screw 6.

Piston 10 has a generally cylindrical shape with a first end 12 and a second end 14 that are distal to one another and connected by a shaft 16. The first end 12 has a sealing portion 54 that is larger in diameter than the shaft 16. The diameter of sealing portion 54 corresponds to diameter of bore 18 in the fixation element 4. The sealing portion 54 may further comprise a recess 56 that is circular in nature. A sealing element 58 may be a sealing ring that is disposed within the recess 56. Sealing element 58 may be made from metal such as iron or steel. Alternatively, sealing element 58 may be made from ceramics, fibrous materials, elastomer and/or plastic or combinations thereof.

As shown in FIG. 1, the bore 18 of the fixation element 4 may have varying widths. At a wide portion 60, the distance between the piston shaft 16 and the bore 18 wall may be greater than at a narrow portion 62. Narrow portion 62 may further contain a recess 64 in which a sealing element 66 may be disposed. Sealing element 66 may be made from metal such as iron or steel. Alternatively, sealing element 66 may be made from ceramics, fibrous materials, elastomer and/or plastic or combinations thereof. As hydraulic fluid flows from the piston portion 22 of the variable volume 20 to the effective portion (and vice versa), sealing element 66 works to keep that hydraulic fluid from leaking.

The piston 10 may further include a threaded portion 68 that is in threaded engagement with a cap 70. The cap 70 may be pressed to the fixation element 4 and/or fixed by a threaded connection 72 to the fixation element 4, in particular to the second end of the cylindrical portion 40 of the fixation element 4 and establishing by this a threaded connection between the piston 10 and the fixation element 4.

The support element 8 comprises a first cylindrical portion 74 and a second cylindrical portion 76 connected to one another by a connection portion 78. The first cylindrical portion 74 forms the lower part of the support element 8 to be positioned on the second component 32. The first cylindrical portion 74 surrounds a part of the screw 6, the first end 38 of the fixation element 4, and the first end 12 of the piston 10. The second cylindrical portion 76 spaced away from the first cylindrical portion 74 by the connection portion 78. The connection portion 78 comprises an opening 80 to guide the fixation element 4 in the support element 8, which opening has a diameter slightly larger than the diameter of the portion of the fixation element 4 guided by the support element 8. The connection portion 78 may further define a recess 82 in which a sealing element 84 may be disposed. Sealing element 84 may seal the distance between the fixation element 4 and the connection portion 78.

The fixation element 4 comprises a plate 86 extending radially from the cylindrical portion 36 of the fixation element 4. Plate 86 may have a diameter that is about the same diameter or a little bit smaller, than the inner diameter of the second cylindrical portion 76 of the support element 8. The plate 86 is positioned normal to the main axis 19 of the fixation element 4 within the second cylindrical portion 76 of the support element 8.

The plate 86, connection portion 78, and the second cylindrical portion 76 of the support element 8 forms the effective portion 24 of the variable volume 20, which is fluidly connected to the piston portion 22 of the variable volume 20 by bore 25 in the fixation element 4.

The effective portion 24 of the variable volume 20 may be fluidly connected to a pressure metering device 88 to determine the pressure of a hydraulic fluid in the effective portion 24. A vent opening 90 is arranged in fluid connection with the effective portion 24 to remove any gases therefrom. The vent opening 90 may be closed by a screw 96.

Figure 2:
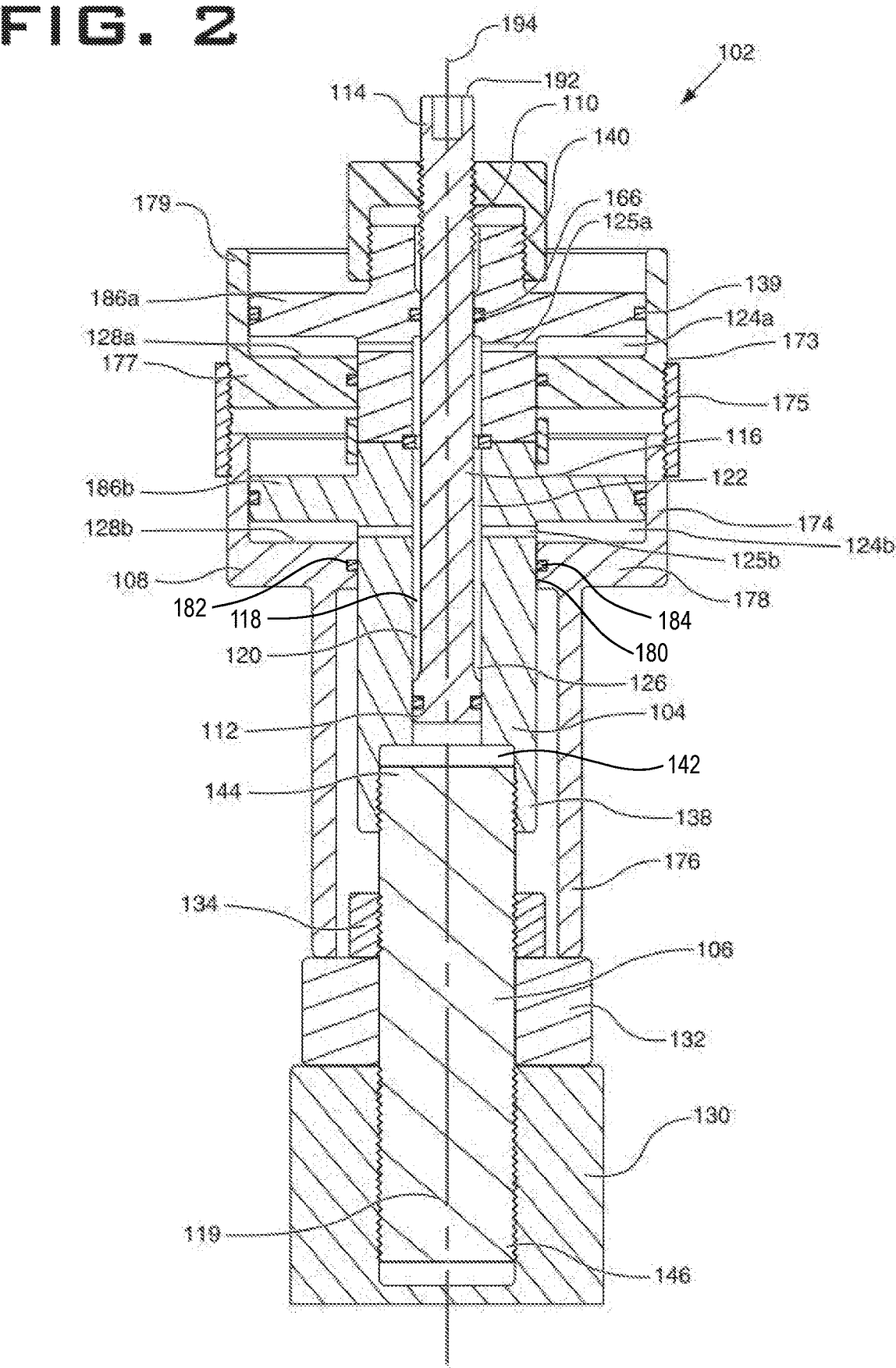
FIG. 2 shows a diagrammatic sectional view of a two staged screw tensioning device.

FIG. 2 discloses a two staged screw tensioning device 102. The screw tensioning device 102 comprises a fixation element 104 that is connectable to a screw 106. The screw tensioning device 102 also comprises a support element 108 that can be moved relative to the fixation element 104 to apply tension to the screw 6. The screw tensioning device 102 further comprises a piston 110 having a first end 112 and a second end 114 that are distal to one another and connected by a shaft 116. The piston 110 is disposed within a bore 118 defined by the fixation element 104. Bore 118 extends along the main axis 119 of the fixation element 104.

A variable volume 120 may be defined by the space between the piston 110 and the bore 118. Hydraulic fluid may be disposed within the variable volume 120. The variable volume 120 may comprise a piston portion 122 and two effective portion(s) (124a, 124b), which may be connected by one or more bores (125a, 125b) that extend axially into the fixation element 104. The piston portion 122 contains a base area 126 and generally runs adjacent the shaft 116. The effective portion(s) 124 also contains base area(s) 128 and generally runs perpendicular to the shaft 116. The base area 126 of the piston portion 122 is smaller than the base area 128 of the effective portion 124.

As shown in FIG. 2, both the fixation element 104 and the support element 108 are similar to those depicted in FIG. 1, except that they have two stages. For example, the fixation element 104 comprises a cylindrical portion 136 that includes a first end 138 and a second end 140. At the first end 138, the fixation element 104 includes a recess 142 in threaded engagement with a first end 144 of the screw 106, while a second end 146 of the screw 106 is connected to a first component 130 through a threaded engagement. In the two stage embodiment, the fixation element 104 further includes two plates (186a, 186b) that extend radially from the cylindrical portion 136.

In the two stage configuration, the support element 108 comprises an upper first cylindrical portion 173 and a lower first cylindrical portion 174 connected to one another by a threaded sleeve 175. The support element 108 further comprises a second cylindrical portion 176, wherein the second cylindrical portion 176 and the lower first cylindrical portion 174 are connected to one another by a connection portion 178. The upper first cylindrical portion 173 includes a horizontal portion 177 and a vertical portion 179.

The first cylindrical portion 174 forms the lower part of the support element 108 to be positioned on a second component 132. The first cylindrical portion 174 surrounds a part of the screw 106, the first end 138 of the fixation element 104, and the first end 112 of the piston 110. The second cylindrical portion 176 spaced away from the lower first cylindrical portion 174 by the connection portion 178. The connection portion 178 comprises an opening 180 to guide the fixation element 104 in the support element 108, which opening has a diameter slightly larger than the diameter of the portion of the fixation element 104 guided by the support element 108. The connection portion 178 may further define a recess 182 in which a sealing element 184 may be disposed. Sealing element 184 may seal the distance between the fixation element 104 and the connection portion 178.

Although not shown, the present disclosure also contemplates three, four or even more staged screw tensioning devices are possible, which may enable a more narrow device to apply tension to screws.

INDUSTRIAL APPLICATION

To connect a first component 30, 130 like a crank case to a second component 32, 132 like a turbo charger mount using a screw tensioning device 2, 102 as shown in FIG. 1 or FIG. 2, the second component 32, 132 is positioned next to the first component 30, 130 and a screw 6, 106 is guided through a hole in the second component 32, 132 and connected to the first component 30, 130 by a threaded connection. As a result the screw 6, 106 extends from a side of the second component most distant to the first component 30, 130, through the second component 32, 132 to the first component 30, 130. A nut 24, 124 is screwed on the screw 6, 106 from the first end 44, 144 of the screw 6, 106, which is not positioned in the first component 30, 130.

The screw tensioning device 2, 102 is positioned over the screw 6, 106, so the screw 6, 106 is housed by the support element 8, 108. The support element 8, 108 is placed on the component 32, 132. The fixation element 4, 104 is positioned to introduce the screw 6, 106 into the recess 42, 142 and to establish a threaded connection between the fixation element 4, 104 and the first end 44, 144 of the screw 6, 106 by the thread 52, 152.

To create a tension in the screw 6, 106 the piston 10, 110 mounted slideable in the fixation element 4, 104 is moved along the axis of movement 94, 194 away from the second component 32, 132 for example by turning the piston 10, 110 using an electric screwdriver or by turning the screw 6, 106 manually. By moving the piston 10, 110 upwards, which means away from the screw 6, 106, the piston portion 22, 122 of the variable volume 20, 120 decreases and hydraulic fluid is pushed from the piston portion 22,122 of first variable volume 20, 120 via the second bores 25, 125 in the fixation element 4, 104 to the effective portion 24, 124a, 124b of the variable volume 20, 120. Therefore the effective portion 24, 124a, 124b of the variable volume 20, 120 increases in volume as the hydraulic fluid is pushed into the effective portion 24, 124a, 124b. As a consequence the fixation element 4, 104 is moved along the main axis of the tension device 2, 102 in respect to the support element 8, 108. So the distance between the fixation element 4, 104 and the first 30, 130 and the second component 32, 132 increases. The screw 6, 106 is tensioned. As the base area 28,128a,128b of the effective portion 24,124a,124b is larger than the base area 26, 126 of the piston portion 22,122, the force to move the piston 10 is multiplied and used to tension the screw 6.

To retain the tension of the screw 6 the nut 34, 134 is fastened on the screw 6, 106, so the nut 34, 134 abuts the second component 30, 130 tightly. This is performed by reaching through openings in the support element 8, 108 with a tool, like a stick that end may be inserted in openings at the side of the nut 34, 134, to turn the nut 34, 134 on the screw 6, 106 from the side.

To loosen a screw 6, 106 which was fastened by a screw tensioning device 2, 102, the support element 8, 108 is positioned around the screw 6, 106 on second component 32. The first, free end 44, 144 of the screw 6, 106 is fixed to the first end 38, 138 of the cylindrical portion 36, 136 of the fixation element 4, 104 by introducing the first end 44, 144 of the screw 6, 106 in the recess 42, 142 of the fixation element 4, 104 and connecting the first end 44, 144 of the screw 6, 106 with the fixation element 4, 104 by a threaded connection 52, 152 in the recess 42, 142.

By turning the piston 10, 110 which is connected to the fixation element 4, 104 or the support element 8, 108 by a threaded connection 68, 168, the piston 10, 110 is moved relative to the fixation element 4, 104, decreasing the piston portion 22, 122 of the variable volume 20, 120. As the piston portion 22, 122 of the variable volume 20, 120 decreases, hydraulic fluid is guided from the piston portion 22, 122 of the variable volume 20, 120 to the effective portion 24, 124a, 124b of the variable volume 20, 120 and increases the pressure in the effective portion 24, 124a, 124b, enlarges the effective portion 24, 124a, 124b of the variable volume 22, 122 and moves the fixation element 4, 104 in respect to the support element 8, 108 and away from the second component 32, 132. This tensions the screw 6, 106. In a further step, the nut 34, 134, positioned on the screw 6, 106 is loosened using a tool reaching through an opening in the support element 8, 108.

After loosening the nut 34, 134 the piston 10, 110 is moved towards the first end 38, 138 of the cylindrical portion 36, 136 of the fixation element 4, 104, increasing the piston portion 22, 122 of the variable volume 20, 120. The effective portion 24, 124a, 124b of the variable volume 20, 120 decreases and the fixation element 4, 104, which is still fixed to the screw 6, 106, moves towards the second component 32, 132 and release the tension in the screw 6, 106. The screw 6, 106 is released from the fixation element 4, 104 and the screw tensioning device 2, 102 is removed from the screw 6, 106.

The invention claimed is:

1. A screw tensioning device for tensioning or loosing tensionable screw connections comprising:
   a support element,
   a fixation element having an upper-end and a lower-end, the fixation element including a cylindrical recess and a first bore, the first bore formed within the fixation element and extending along a main axis of the fixation element to the cylindrical recess, the cylindrical recess disposed in the lower-end and configured to receive a screw, the fixation element disposed within and moveable relative to the support element and arranged to be moved relative to the support element to apply tension to or remove tension from the screw, and
   a piston positioned within said first bore and movable within the fixation element, wherein:
   the support element, the fixation element and the piston define a variable volume within the screw tensioning device;
   the variable volume contains a fluid;
   the variable volume comprises a piston portion and an effective portion;
   the piston portion is defined by a space between the piston and the first bore formed within the fixation element;
   the effective portion is defined by a space between the support element and the fixation element;
   the piston portion and the effective portion are connected by one or more second bores in the fixation element that extend perpendicular to said main axis of the fixation element from the piston portion to the effective portion and provide for flow of the fluid between the piston portion and the effective portion;
   the piston is configured in the first bore to provide that movement of the piston in the first bore towards the upper-end of the fixation element displaces fluid from the piston portion into the effective portion; and
   the displacement of the fluid into the effective portion increases pressure in the effective portion pushing the fixation element relative to the support element in a tension creation direction to create tension in the screw without using an external hydraulic pump;
   wherein the piston comprises a threaded portion that is engaged such that rotation of the piston about the main axis of movement of the piston in a first direction causes the piston to move relative to the fixation element in the first bore towards the upper-end of the fixation element to increase tension in the screw, and rotation of the piston about the main axis of movement of the piston in an opposite direction causes the piston to move relative to the fixation element in the first bore towards the lower-end of the fixation element to decrease tension in the screw.

2. The screw tensioning device of claim 1, wherein the piston is connected to the fixation element by a threaded connection.

3. The screw tensioning device of claim 1, wherein the piston comprises a first end and a second end and a shaft there between, and wherein the variable volume is defined by the shaft, the support element and the fixation element.

4. The screw tensioning device of claim 1, wherein a first end of the piston comprises a sealing portion with a larger diameter than the shaft.

5. The screw tensioning device of claim 1, wherein the fixation element is housed at least partly in the support element.

6. The screw tensioning device of claim 1, wherein a base area of the piston portion is smaller than a base area of the effective portion.

7. The screw tensioning device of claim 1 further comprising a sealing element between the fixation element and the piston configured to seal the variable volume in a direction of a second end of the piston.

8. The screw tensioning device of claim 1 further comprising a sealing element between the fixation element and the support element configured to seal the variable volume.

9. The screw tensioning device of claim 1, wherein a main axis of movement of the piston is parallel to a main axis of the screw.

10. A method for manipulating tension within a screw connection, comprising:
    positioning a support element on a component to be connected by the screw connection, wherein:
    the support element has a fixation element disposed within and moveable relative to the support element and arranged to be moved relative to the support element to apply tension to or remove tension from a screw of the screw connection, the fixation element having an upper-end and a lower-end, the fixation element comprising a cylindrical recess and a first bore, the first bore formed within the fixation element and extending along a main axis of the fixation element to the cylindrical recess, the cylindrical recess disposed in the lower-end and configured to receive the screw,
    a piston is positioned within said first bore and movable relative to the fixation element, the support element, the fixation element and the piston define a variable volume within the screw tensioning device; and the variable volume contains a fluid, connecting the fixation element to the screw to which tension is to be applied or removed, moving linearly the fixation element in respect to the support element by moving the piston relative to the fixation element in the first bore in the fixation element, wherein:

the piston is moved in a direction in the first bore that causes the fluid contained in the variable volume to be displaced from a piston portion defined by the first bore of the fixation element and the piston into an effective portion defined by the support element and the fixation element;

the piston portion and the effective portion are connected by one or more second bores in the fixation element that extend perpendicular to said main axis, thereby providing fluid communication from the piston portion to the effective portion, and wherein moving linearly the fixation element in respect to the support element comprises linearly moving the piston and increasing a pressure of the fluid in the effective portion by forcing the fluid through the second bore into the effective portion and pushing the fixation element relative to the support element in a tension creation direction to create tension in the screw without using an external hydraulic pump;

wherein the piston comprises a threaded portion that is engaged such that rotation of the piston about the main axis of movement in a first direction causes the piston to move relative to the fixation element in the first bore towards the upper-end of the fixation element to increase tension in the screw, and rotation of the piston about the main axis of movement of the piston in an opposite direction causes the piston to move relative to the fixation element in the first bore towards the lower-end of the fixation element to decrease tension in the screw.

11. The method of claim 10, wherein the variable volume comprises the piston portion and the effective portion.

* * * * *